US011269999B2

(12) United States Patent
Soryal

(10) Patent No.: US 11,269,999 B2
(45) Date of Patent: Mar. 8, 2022

(54) PROTECTING COMPUTING DEVICES FROM MALICIOUS TAMPERING

(71) Applicant: AT&T Intellectual Property I, L.P., Atlanta, GA (US)

(72) Inventor: Joseph Soryal, Ridgewood, NY (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 311 days.

(21) Appl. No.: 16/459,043

(22) Filed: Jul. 1, 2019

(65) Prior Publication Data

US 2021/0004462 A1 Jan. 7, 2021

(51) Int. Cl.
*G06F 21/56* (2013.01)

(52) U.S. Cl.
CPC .................... *G06F 21/56* (2013.01)

(58) Field of Classification Search
CPC .......... G06F 21/56; G06F 21/73; G06F 21/70; G06F 21/76; G06F 21/55; G06F 21/57; G06F 21/86
USPC ......................................................... 726/23
See application file for complete search history.

(56) References Cited

U.S. PATENT DOCUMENTS

| | | | | |
|---|---|---|---|---|
| 9,071,638 B1* | 6/2015 | Aziz | ...................... | G06F 21/554 |
| 9,129,536 B2* | 9/2015 | Tkacik | ................... | H04L 9/0866 |
| 9,740,888 B1* | 8/2017 | Aga | ......................... | G06F 21/86 |
| 9,876,645 B1* | 1/2018 | Ramalingam | ........... | G06F 21/44 |
| 9,934,411 B2* | 4/2018 | Kwong | .................. | H04L 9/3278 |
| 9,948,470 B2* | 4/2018 | Guo | ...................... | H04L 63/0853 |
| 10,002,362 B1* | 6/2018 | Endress | .................. | G09C 1/00 |
| 10,107,855 B1* | 10/2018 | Corbett | ................. | G01R 31/2851 |
| 10,127,409 B1* | 11/2018 | Wade | ..................... | G06Q 20/30 |
| 10,132,858 B2* | 11/2018 | Vanhoucke | ........ | G01R 31/2836 |
| 10,554,405 B1* | 2/2020 | Endress | .................. | H04L 9/088 |
| 10,587,421 B2* | 3/2020 | Hojsik | ..................... | G06F 21/44 |
| 10,877,531 B2* | 12/2020 | Bittiestone | .............. | G06F 21/73 |
| 2003/0204743 A1* | 10/2003 | Devadas | ................ | G06F 21/77 726/9 |
| 2004/0030912 A1* | 2/2004 | Merkle, Jr. | ............. | G06F 12/08 726/26 |
| 2007/0169183 A1* | 7/2007 | Kipnis | ............. | G06Q 20/40975 726/9 |
| 2008/0034334 A1* | 2/2008 | Laouamri | ........... | G06F 11/2294 716/136 |
| 2009/0320110 A1* | 12/2009 | Nicolson | ............... | H04L 9/3268 726/6 |

(Continued)

*Primary Examiner* — Kambiz Zand
*Assistant Examiner* — Mahabub S Ahmed

(57) ABSTRACT

In one example, a method performed by a processing system of a server includes sending an instruction to a controller installed on an integrated circuit chip of a remote computing device, wherein the instruction requests that the controller issue a challenge to the integrated circuit, receiving a first signature of the integrated circuit chip from the controller, wherein the first signature is derived by the controller from a response of the integrated circuit chip to the challenge, comparing the first signature to a second signature that is stored on the server, wherein the second signature was derived through testing of the integrated circuit chip prior to the integrated circuit chip being deployed in the remote computing device, and generating an alert when the first signature fails to match the second signature, wherein the alert indicates that the integrated circuit chip may have been tampered with.

20 Claims, 4 Drawing Sheets

(56) References Cited

U.S. PATENT DOCUMENTS

| | | | |
|---|---|---|---|
| 2010/0031065 A1* | 2/2010 | Futa | H04L 9/0866 713/194 |
| 2010/0073147 A1* | 3/2010 | Guajardo Merchan | G06K 19/07309 340/10.51 |
| 2010/0127822 A1* | 5/2010 | Devadas | H04L 9/3278 340/5.8 |
| 2010/0241864 A1* | 9/2010 | Kelley | G01S 19/42 713/179 |
| 2012/0131340 A1* | 5/2012 | Teuwen | H04L 9/3278 713/168 |
| 2012/0158339 A1* | 6/2012 | Chawla | G06F 11/3024 702/89 |
| 2012/0233685 A1* | 9/2012 | Palanigounder | H04W 12/06 726/9 |
| 2013/0047209 A1* | 2/2013 | Satoh | G09C 1/00 726/2 |
| 2013/0082733 A1* | 4/2013 | Shimizu | H04L 9/3278 326/8 |
| 2013/0133031 A1* | 5/2013 | Fainstein | G06F 21/73 726/2 |
| 2013/0141137 A1* | 6/2013 | Krutzik | G09C 1/00 326/8 |
| 2013/0145467 A1* | 6/2013 | Yodaiken | G06F 21/57 726/23 |
| 2013/0198873 A1* | 8/2013 | Motika | G01R 31/318328 726/34 |
| 2013/0202107 A1* | 8/2013 | Danger | G01R 31/31719 380/44 |
| 2014/0025944 A1* | 1/2014 | Maletsky | G06F 21/72 713/150 |
| 2014/0103344 A1* | 4/2014 | Tehranipoor | G01R 31/31725 257/48 |
| 2014/0108786 A1* | 4/2014 | Kreft | H04L 9/0643 713/156 |
| 2014/0156998 A1* | 6/2014 | Lambert | H04L 9/3273 713/182 |
| 2014/0340112 A1* | 11/2014 | Tehranipoor | H04L 9/0866 326/8 |
| 2015/0007337 A1* | 1/2015 | Krutzik | G06F 21/73 726/26 |
| 2015/0046715 A1* | 2/2015 | Ignatchenko | H04L 9/3278 713/176 |
| 2015/0143545 A1* | 5/2015 | Falk | H04L 9/3271 726/30 |
| 2015/0192637 A1* | 7/2015 | Falk | H04L 9/3278 326/16 |
| 2015/0229477 A1* | 8/2015 | Blair | H04L 63/0823 713/156 |
| 2016/0047855 A1* | 2/2016 | Bhunia | G01R 31/31858 324/763.01 |
| 2016/0357176 A1* | 12/2016 | Chand | G05B 19/0428 |
| 2016/0359636 A1* | 12/2016 | Kreft | H04L 9/0643 |
| 2017/0005811 A1* | 1/2017 | Tremlet | H04L 63/0823 |
| 2017/0091438 A1* | 3/2017 | Raziel | G06F 21/575 |
| 2017/0329954 A1* | 11/2017 | Lao | G06F 21/44 |
| 2017/0366553 A1* | 12/2017 | Shetye | H04L 67/2842 |
| 2018/0013779 A1* | 1/2018 | Aguayo Gonzalez | G09C 1/00 |
| 2018/0019872 A1* | 1/2018 | Radocchia | H04L 9/3271 |
| 2018/0102907 A1* | 4/2018 | Lin | H04L 9/3278 |
| 2018/0159690 A1* | 6/2018 | Ramalingam | G06F 21/645 |
| 2018/0167391 A1* | 6/2018 | Lawson | H04L 63/0876 |
| 2018/0183613 A1* | 6/2018 | Dafali | H04L 9/3278 |
| 2018/0225459 A1* | 8/2018 | Zarakas | G06F 21/572 |
| 2019/0026457 A1* | 1/2019 | Plusquellic | G06F 21/30 |
| 2019/0028283 A1* | 1/2019 | Sharifi | G06F 21/86 |
| 2019/0028284 A1* | 1/2019 | Rezayee | H04L 9/3278 |
| 2019/0334730 A1* | 10/2019 | Endress | H04L 67/1042 |
| 2019/0378575 A1* | 12/2019 | Lu | H04L 9/3278 |
| 2019/0384915 A1* | 12/2019 | Hars | H04L 9/3236 |
| 2020/0089866 A1* | 3/2020 | Aguayo Gonzalez | G06F 21/52 |
| 2020/0099541 A1* | 3/2020 | Norrman | H04W 12/12 |
| 2020/0344077 A1* | 10/2020 | Cheng | H04L 9/3278 |
| 2020/0351108 A1* | 11/2020 | Moriyama | H04L 9/0662 |
| 2021/0148977 A1* | 5/2021 | Bhunia | G01R 31/31813 |
| 2021/0258174 A1* | 8/2021 | Schoinianakis | G06F 21/73 |

* cited by examiner

PROTECTING COMPUTING DEVICES FROM MALICIOUS TAMPERING

The present disclosure relates generally to hardware security, and relates more particularly to devices, non-transitory computer-readable media, and methods for protecting computing devices against malicious tampering.

BACKGROUND

A motherboard is the main printed circuit board (PCB) found in computing devices including consumer electronics and data center servers. A motherboard typically includes a plurality of integrated circuit chips and capacitors that collectively facilitate communications between a computing device's various electronic components (e.g., central processing unit, memory, input/output devices and other peripherals, etc.). Some motherboards (including motherboards for servers, switches, memory devices, and the like) may further include a baseboard management controller (BMC), which is a type of superchip or small computer that may be used by an administrator to remotely access a malfunctioning computing device.

SUMMARY

In one example, the present disclosure discloses a device, computer-readable medium, and method for protecting computing devices against malicious tampering. For example, a method performed by a processing system of a server may include sending an instruction to a controller installed on an integrated circuit chip of a remote computing device, wherein the instruction requests that the controller issue a challenge to the integrated circuit, receiving a first signature of the integrated circuit chip from the controller, wherein the first signature is derived by the controller from a response of the integrated circuit chip to the challenge, comparing the first signature to a second signature that is stored on the server, wherein the second signature was derived through testing of the integrated circuit chip prior to the integrated circuit chip being deployed in the remote computing device, and generating an alert when the first signature fails to match the second signature, wherein the alert indicates that the integrated circuit chip may have been tampered with.

In another example, a non-transitory computer-readable medium may store instructions which, when executed by a processing system of a server, cause the processing system to perform operations. The operations may include sending an instruction to a controller installed on an integrated circuit chip of a remote computing device, wherein the instruction requests that the controller issue a challenge to the integrated circuit, receiving a first signature of the integrated circuit chip from the controller, wherein the first signature is derived by the controller from a response of the integrated circuit chip to the challenge, comparing the first signature to a second signature that is stored on the server, wherein the second signature was derived through testing of the integrated circuit chip prior to the integrated circuit chip being deployed in the remote computing device, and generating an alert when the first signature fails to match the second signature, wherein the alert indicates that the integrated circuit chip may have been tampered with.

In another example, a system deployed on an integrated circuit chip of a computing device may include a plurality of sensors to monitor a plurality of physical conditions of the integrated circuit chip and a controller communicatively coupled to the sensors to issue a challenge to the integrated circuit chip and to derive a first signature for the integrated circuit chip from a response of the integrated circuit chip to the challenge.

BRIEF DESCRIPTION OF THE DRAWINGS

The teachings of the present disclosure can be readily understood by considering the following detailed description in conjunction with the accompanying drawings, in which.

To facilitate understanding, similar reference numerals have been used, where possible, to designate elements that are common to the figures.

DETAILED DESCRIPTION

Figure 1:
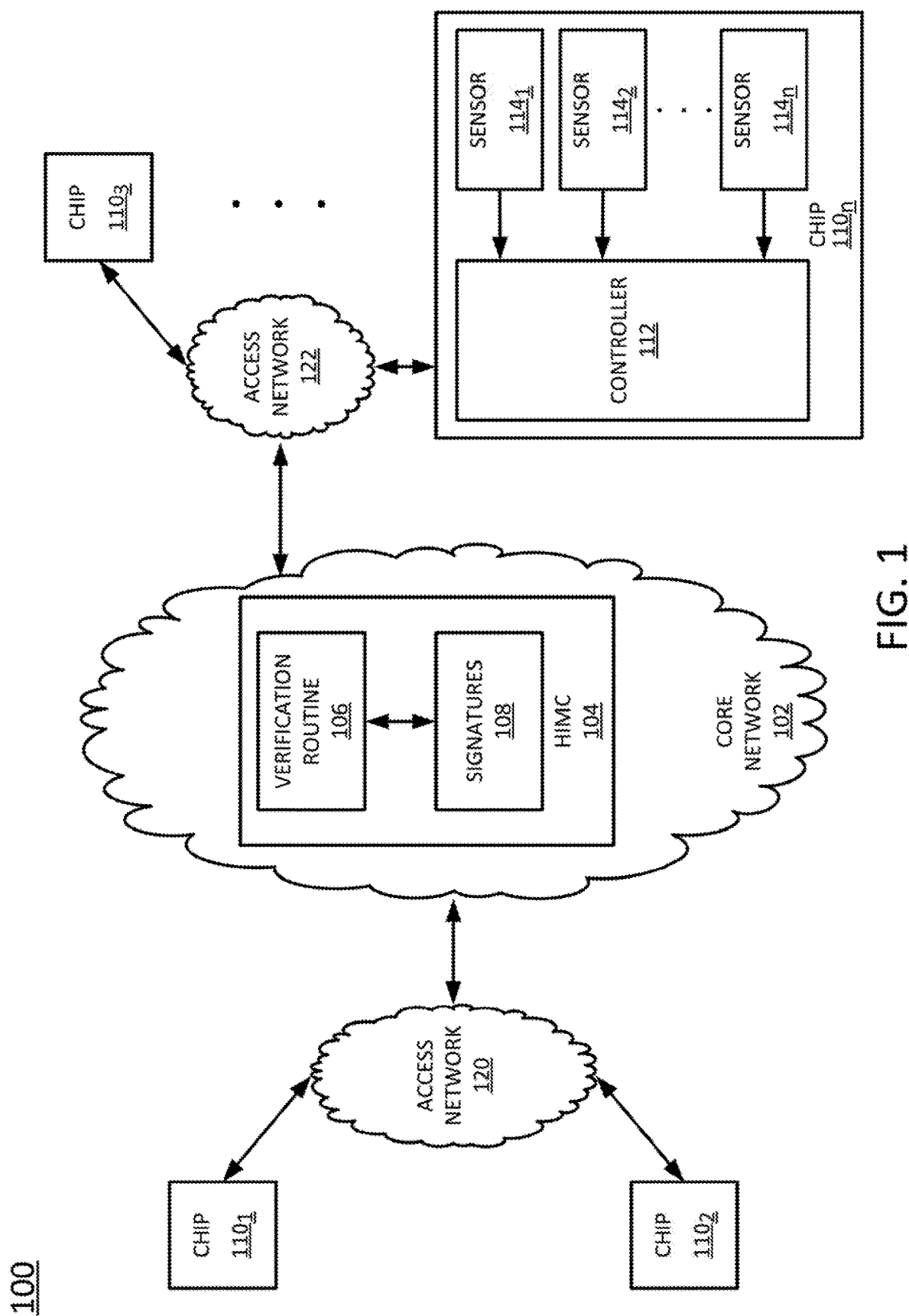
FIG. 1 illustrates an example system in which examples of the present disclosure for protecting computing devices against malicious tampering may operate.

The present disclosure broadly discloses methods, computer-readable media, and devices for protecting computing devices against malicious tampering. As discussed above, a motherboard typically includes a plurality of integrated circuit chips and capacitors that collectively facilitate communications between a computing device's various electronic components (e.g., central processing unit, memory, input/output devices and other peripherals, etc.). In some cases, a malicious party may, unknowingly to a computing device's end user, install hardware elements on the motherboard that may cause the computing device to carry out unwanted operations. These unwanted operations may include, for example, preparing the computing device's operating system to accept code (e.g., malware) from an anonymous remote computing device, revealing encryption keys to a remote computing device, blocking security updates to the computing device, opening new network connections to the computing device, altering line by line operation of the computing device, and other operations.

The hardware elements installed by the malicious third party may be connected to the computing device's baseboard management controller (BMC). This may give the malicious third party access to the computing device's most sensitive code, even if the computing device has crashed or is powered off. For instance, the Linux operating system, which runs in many servers, includes code that authorizes a user by verifying a typed password against a stored, encrypted password. A chip maliciously planted in one of the servers may alter part of this code, so that the server will not ask a user for a password.

Examples of the present disclosure utilize a secure hardware controller, which is installed on a critical integrated circuit chip on a computing device's PCB (e.g., motherboard), to monitor certain physical parameters of the integrated circuit chip. The secure hardware controller may collect data about the physical parameters from a plurality of sensors on the integrated circuit chip, and use the data to generate a signature. The signature may comprise a physical unclonable function (PUF).

The secure hardware controller may transmit the signature, using a secure communications protocol, to a remote hardware integrity management center (HIMC) server. The HIMC may compare the signature generated by the secure hardware controller to signatures that have been previously stored on the HIMC server (e.g., by the manufacturer of the computing device or a third-party testing and validation entity). When the signature generated by the secure hardware controller does not match the stored signature(s), this may indicate that the integrated circuit chip has been tampered with.

As discussed above, examples of the present disclosure may rely on the use of PUFs. Although conventionally used for cytological applications, PUFs are used in examples of the present disclosure to verify the integrity (e.g., freedom from tampering) of an integrated circuit chip. The PUFs comprise physically-defined, digital "fingerprints" which uniquely identify the critical integrated circuit chips of a computing device. PUFs are easy to evaluate using a physical system, and PUF outputs resemble random functions.

To further aid in understanding the present disclosure, FIG. 1 illustrates an example system 100 in which examples of the present disclosure for protecting computing devices against malicious tampering may operate. The system 100 may include any one or more types of communication networks, such as a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, a wired network, a wireless network, and/or a cellular network (e.g., 2G-5G, a long term evolution (LTE) network, and the like) related to the current disclosure. It should be noted that an IP network is broadly defined as a network that uses Internet Protocol to exchange data packets. Additional example IP networks include Voice over IP (VoIP) networks, Service over IP (SoIP) networks, and the like.

In one example, the system 100 may comprise a core network 102. The core network 102 may be in communication with one or more access networks 120 and 122. In one example, the core network 102 may combine core network components of a wired or cellular network with components of a triple play service network; where triple-play services include telephone services, Internet services and television services to subscribers. For example, the core network 102 may functionally comprise a fixed mobile convergence (FMC) network, e.g., an IP Multimedia Subsystem (IMS) network. In addition, the core network 102 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. The core network 102 may further comprise a broadcast television network, e.g., a traditional cable provider network or an Internet Protocol Television (IPTV) network, as well as an Internet Service Provider (ISP) network. In one example, the core network 102 may include a plurality of television (TV) servers (e.g., a broadcast server, a cable head-end), a plurality of content servers, an advertising server (AS), an interactive TV/video on demand (VoD) server, and so forth. As further illustrated in FIG. 1, the core network 102 may include a hardware integrity management center (HIMC) server 104. For ease of illustration, various additional elements of network 102 are omitted from FIG. 1.

In one example, the access networks 120 and 122 may comprise Digital Subscriber Line (DSL) networks, public switched telephone network (PSTN) access networks, broadband cable access networks, Local Area Networks (LANs), wireless access networks (e.g., an IEEE 802.11/Wi-Fi network and the like), cellular access networks, 3rd party networks, and the like. For example, the operator of core network 102 may provide telecommunication services to subscribers via access networks 120 and 122. In one example, the access networks 120 and 122 may comprise different types of access networks, may comprise the same type of access network, or some access networks may be the same type of access network and other may be different types of access networks. In one example, the core network 102 may be operated by a telecommunication network service provider. The core network 102 and the access networks 120 and 122 may be operated by different service providers, the same service provider or a combination thereof, or the access networks 120 and/or 122 may be operated by entities having core businesses that are not related to telecommunications services, e.g., corporate, governmental, or educational institution LANs, and the like.

In one example, the access networks 120 and 122 may be in communication with one or more endpoint devices. These endpoint devices may include, for example servers, where each of the servers includes a PCB (e.g., motherboard) housing a plurality of integrated circuit chips $110_1$-$110_n$ (hereinafter individually referred to as a "chip 110" or collectively referred to as "chips 110"). Access networks 120 and 122 may transmit and receive communications between the chips 110 and the HIMC server 104, as discussed in further detail below.

In one example, each chip 110 is tested prior to deployment in a computing device (e.g., at time of manufacture, or after manufacture by prior to deployment). As discussed above, the chips 110 may be tested by the respective manufacturers or by a third-party testing and validation entity. Testing of a chip 110 may involve operating the chip 110 under different conditions to derive a signature (e.g., a physical unclonable function) for the chip 110. For instance, when certain parameters of the chip 110 such as temperature, age, frequency, and the like fall outside threshold ranges, this may alter the chip's path delay (which is otherwise substantially constant). The combination of parameters that causes the change in delay may function as a unique signature for the chip 110, since no two chips' path delays will be altered in precisely the same way by the precisely the same combination of parameters (thanks to process variations during fabrication). The unique signatures 108 for each chip 110 may be stored in the HIMC server 104. The signatures 108 could also be sent (e.g., via email) to a human administrator or end user. In one example, the HIMC server 104 stores a plurality of signatures for each chip 110, where each signature represents the chip's response to a different set of conditions.

In one example, each of the chips 110 may be configured as illustrated by the example chip $110_n$. For example, each chip 110 may include a secure hardware controller 112 and a plurality of sensors $114_1$-$114_m$ (hereinafter individually referred to as a "sensor 114" or collectively referred to as "sensors 114"). The sensors 114 may include different types of sensors, such as temperature sensors, voltage sensors, current sensors, frequency sensors, and the like. Each of the sensors 114 may thus be designed to collect data regarding a different physical parameter of the chip 110. The sensors 114 may collect the data during testing of the chip 110, as described above. The sensors 114 may also continue to collect the data after deployment of the chip 110 and to send the data to the HIMC server 104, as described in further detail below.

The sensors 114 may send the collected data to the secure hardware controller 112. The secure hardware controller 112 may comprise a microcontroller that communicates with the HIMC server 104. In a further example, the secure hardware controller 112 may be configured for the specific type of the chip 110, e.g., such that the secure hardware controller 112 is able to evaluate different valid paths on the chip 110. In one example, the secure hardware controller 112 and the sensors 114 may be installed in a secure manner by the manufacturer of the chip 110 or by a testing and validation entity. In a further example, the secure hardware controller 112 may be housed within a small, tamper-resistant enclosure on the chip 110.

In operation, the chips 110 may be tested to generate unique signatures which are stored in the HIMC server 104 as discussed above. Subsequently, the HIMC server 104 may cooperate with the secure hardware controller 110 on each chip 110 to verify that the chip 110 has not been tampered with. For example, the HIMC server 104 may execute a verification routine 106 at various points during the supply chain, operation, and maintenance of the chip 110. The HIMC server 104 may also execute the verification routine in response to the occurrence of a predefined event (e.g., every time the server of which the chip 110 is part is powered on), periodically (e.g., every x hours or days), on demand (e.g., in response to a request from the secure hardware controller 112 of the chip), or according to any other schedule.

The verification routine 106 may cause the HIMC server 104 to send an instruction to the secure hardware controller 112 instructing the secure hardware controller 112 to generate and provide a signature for the chip 110. The secure hardware controller 112 may, in response, generate the signature for the chip 110 based on current data provided by the sensors 114. The secure hardware controller 104 may send the generated signature to the HIMC server 104, which may compare the generated signature to the stored signature (s) 108 for the chip 110. If the generated signature matches the stored signature, then it can be assumed that the chip 110 has not been tampered with. If, however, the generated signature does not match the stored signature, then it may be assumed that the chip 110 has been tampered with.

A secure communications protocol, such as two-way transport layer security (TLS), may be used to carry communications from the HIMC server 104 to the secure hardware controller 112, and vice versa. In accordance with the present disclosure, any of the HIMC server 104 and/or the secure hardware controller 112 may comprise a computing system or server, such as computing system 400 depicted in FIG. 4, and may be configured to provide one or more operations or functions in connection with examples of the present disclosure for protecting computing devices against malicious tampering, as described herein.

Figure 4:
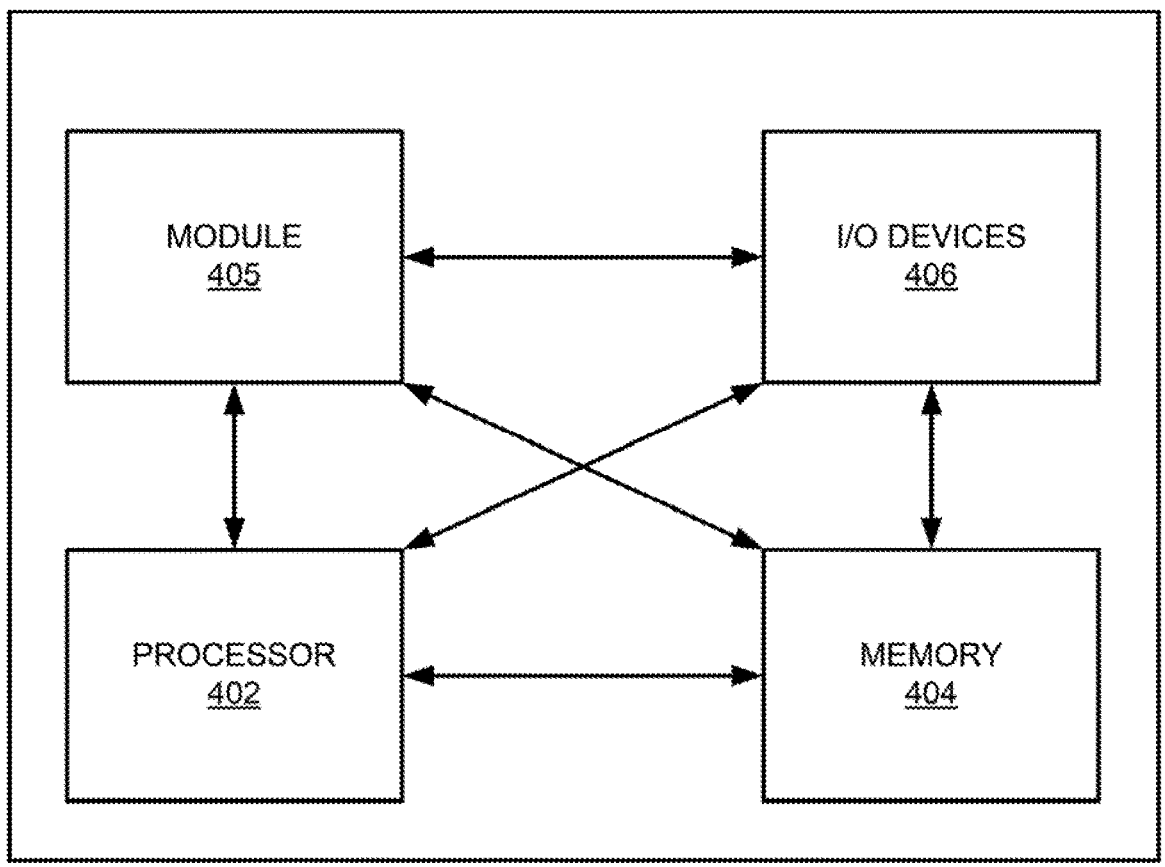
FIG. 4 illustrates an example of a computing device, or computing system, specifically programmed to perform the steps, functions, blocks, and/or operations described herein.

In accordance with the present disclosure, any of the HIMC server 104 and/or the secure hardware controller 112 may comprise one or more physical devices, e.g., one or more computing systems or servers, such as computing system 400 depicted in FIG. 4, and may be configured to provide one or more operations protecting computing devices against malicious tampering, as described herein. It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 4 and discussed below) or multiple computing devices collectively configured to perform various steps, functions, and/or operations in accordance with the present disclosure.

It should be noted that the system 100 has been simplified. Thus, those skilled in the art will realize that the system 100 may be implemented in a different form than that which is illustrated in FIG. 1, or may be expanded by including additional endpoint devices, access networks, network elements, application servers, etc. without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements. For example, the system 100 may include other network elements (not shown) such as border elements, routers, switches, policy servers, security devices, gateways, a content distribution network (CDN) and the like. For example, portions of the core network 102 and/or access networks 120 and 122 may comprise a content distribution network (CDN) having ingest servers, edge servers, and the like for packet-based streaming of video, audio, or other content. Similarly, although only two access networks, 120 and 122 are shown, in other examples, access networks 120 and/or 122 may each comprise a plurality of different access networks that may interface with the core network 102 independently or in a chained manner. Thus, these and other modifications are all contemplated within the scope of the present disclosure.

Figure 2:
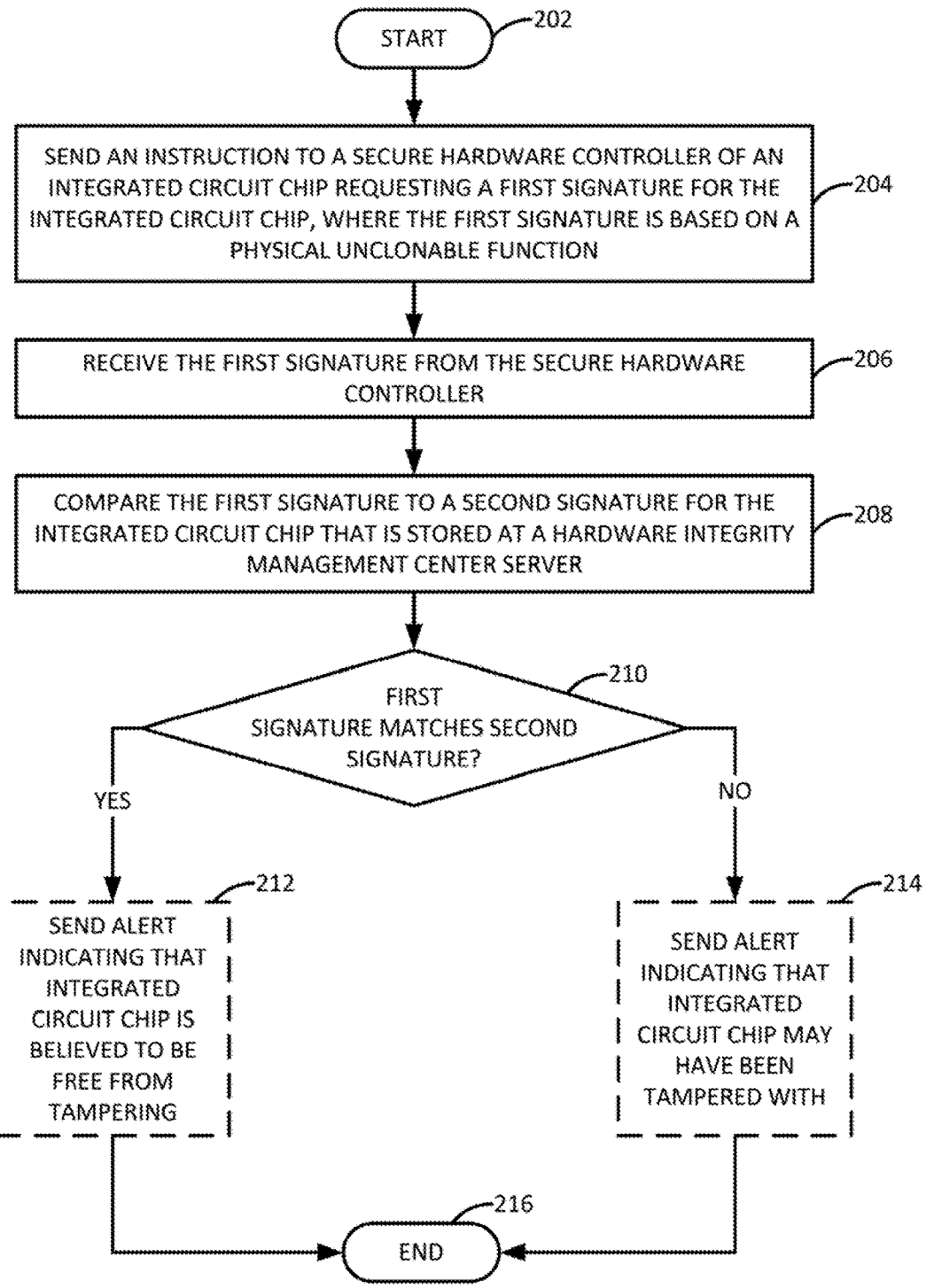
FIG. 2 illustrates a flowchart of an example method for protecting computing devices against malicious tampering, in accordance with the present disclosure.

FIG. 2 illustrates a flowchart of an example method 200 for protecting computing devices against malicious tampering, in accordance with the present disclosure. In one example, steps, functions and/or operations of the method 200 may be performed by a device as illustrated in FIG. 1, e.g., an HIMC server 104 or any one or more components thereof. In one example, the steps, functions, or operations of method 200 may be performed by a computing device or system 400, and/or a processing system 402 as described in connection with FIG. 4 below. For instance, the computing device 400 may represent at least a portion of HIMC server 104 in accordance with the present disclosure. For illustrative purposes, the method 200 is described in greater detail below in connection with an example performed by a processing system, such as processing system 402. The method 200 begins in step 202 and proceeds to step 204.

At step 204, the processing system (of an HIMC server in communication with a plurality of secure hardware controllers) may send an instruction to a secure hardware controller of an integrated circuit chip requesting a first signature for the integrated circuit chip. The integrated circuit chip may be housed on a motherboard of a computing device, such as a server. The secure hardware controller may also be housed on the motherboard of the computing device, and may be connected to a plurality of sensors that monitors various conditions of the integrated circuit chip (e.g., temperature, supply voltage, electro-magnetic interference, frequency, etc.). The secure hardware controller may derive the first signature by issuing a challenge to the integrated circuit chip, as discussed in further detail below. In one example, the instruction may be sent from the processing system to the secure hardware controller using a secure communications protocol, such as two-way TLS. For instance, the instruction may be encoded in a data packet that is encrypted using encryption keys that are generated specifically and uniquely for the connection between the processing system and the secure hardware controller. Furthermore, the data packet encoding the instruction may include a message authentication code that guards against loss or alteration of the instruction during transmission.

In one example, the instruction is sent in step 204 in response to the occurrence of a predefined event (e.g., the computing device that contains the integrated circuit chip being powered on). In another example, the instruction is sent in step 204 according to a predefined schedule (e.g., periodically every x hours or days). In another example, the instruction is sent in step 204 on demand (e.g., in response to a request from the secure hardware controller). In another example, the instruction sent in step 204 may be sent according to any other schedule.

At step 206, the processing system may receive the first signature from the secure hardware controller. The first signature may be derived by the secure hardware controller from current conditions of the integrated circuit chip, e.g., as measured and reported to the secure hardware controller by the plurality of sensors. For example, the first signature may comprise a PUF. In one example, the first signature may be sent by the secure hardware controller to the processing system using a secure communications protocol, such as two-way TLS, as discussed above.

At step 208, the processing system may compare the first signature to a second signature for the integrated circuit chip that is stored at the HIMC server. As discussed above, the second signature may be derived from testing of the integrated circuit chip prior to deployment (e.g., by the manufacturer or by a testing and validation entity). Thus, the second signature may represent what the processing system expects to see when receiving the first signature from the secure hardware controller.

In step 210, the processing system may determine whether the first signature and the second signature match.

If the processing system determines in step 210 that the first signature and the second signature match, then the method 200 may optionally proceed to step 212. At optional step 212 (illustrated in phantom), the processing system may send an alert (e.g., to the secure hardware controller in the form of a message, to a human administrator or end user in the form of an email, or the like) indicating that the integrated circuit chip is believed to be free from tampering. In one example, however, no alert is generated as long as the integrated circuit chip is believed to be free from tampering (e.g., alerts are only generated if tampering is suspected).

If, however, the processing system determines in step 210 that the first signature and the second signature do not match, then the method 200 may proceed to step 214. At step 214, the processing system may send an alert (e.g., to the secure hardware controller in the form of a message, to a human administrator or end user in the form of an email, or the like) indicating that the integrated circuit chip may have been tampered with.

In one example, any alert sent in accordance with step 212 or 214 may be sent by the secure hardware controller using a secure communications protocol, such as two-way TLS, as discussed above.

At step 216, the method 200 may end.

Figure 3:
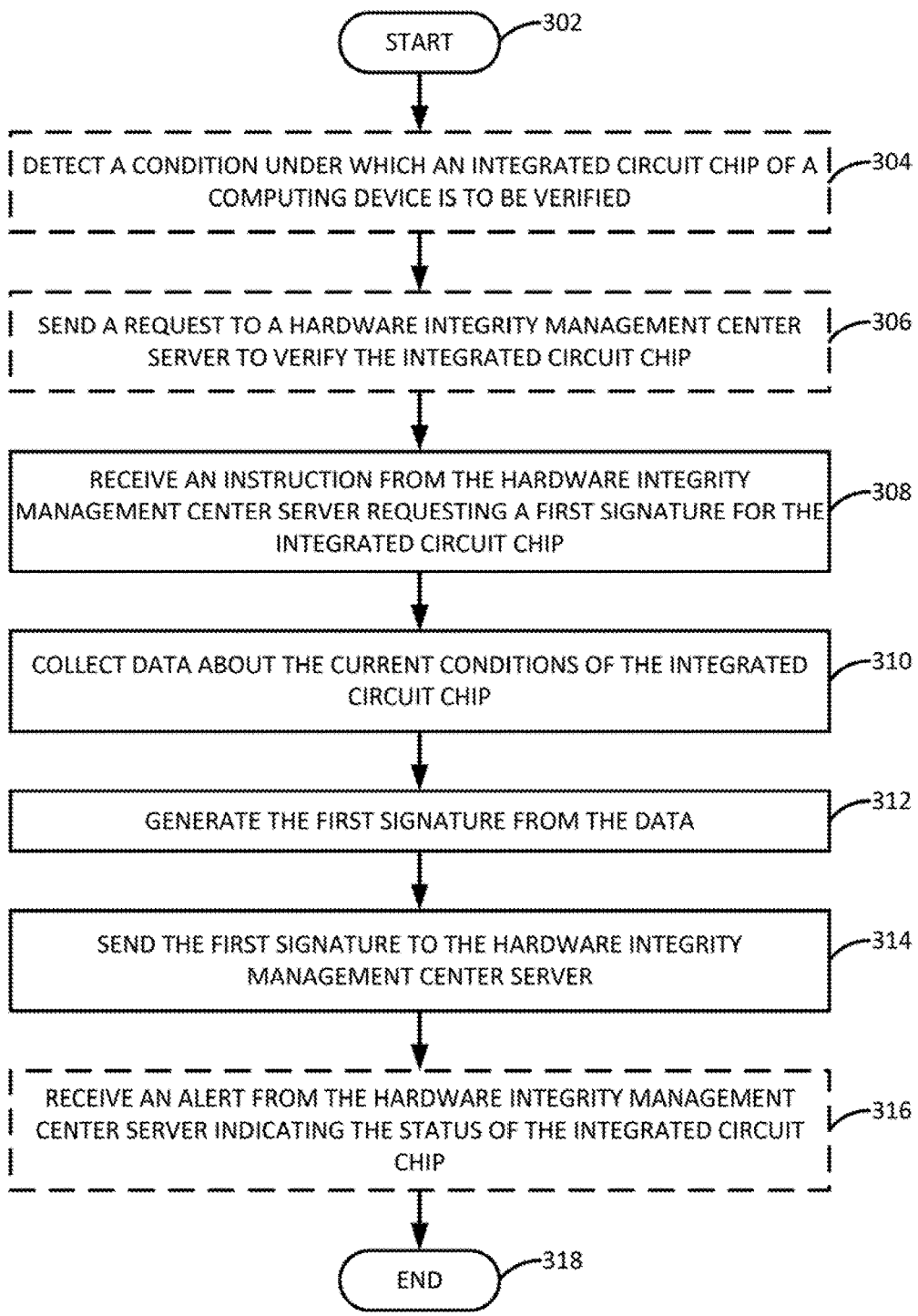
FIG. 3 illustrates a flowchart of another example method for protecting computing devices against malicious tampering, in accordance with the present disclosure.

FIG. 3 illustrates a flowchart of another example method 300 for protecting computing devices against malicious tampering, in accordance with the present disclosure. In one example, steps, functions and/or operations of the method 300 may be performed by a device as illustrated in FIG. 1, e.g., a secure hardware controller 112 or a chip 110, or any one or more components thereof. In one example, the steps, functions, or operations of method 300 may be performed by a computing device or system 400, and/or a processing system 402 as described in connection with FIG. 4 below. For instance, the computing device 400 may represent at least a portion of secure hardware controller 112 in accordance with the present disclosure. For illustrative purposes, the method 300 is described in greater detail below in connection with an example performed by a processing system, such as processing system 402. The method 300 begins in step 302 and proceeds to step 304.

At optional step 304 (illustrated in phantom), the processing system (of a secure hardware controller installed on a motherboard of a computing device, such as a server) may detect a condition under which an integrated circuit chip of the computing device is to be verified (i.e., determined to be free from tampering). The integrated circuit chip may also be housed on the motherboard. The secure hardware controller may be connected to a plurality of sensors that monitors various conditions of the integrated circuit chip (e.g., temperature, supply voltage, electro-magnetic interference, frequency, etc.).

As discussed above, in one example, the occurrence of a predefined event (e.g., the computing device that contains the integrated circuit chip being powered on) may trigger a verification routine. In another example, the verification routine may be performed according to a predefined schedule (e.g., periodically every x hours or days). In another example, the verification routine may be performed according to any other schedule.

At optional step 306 (illustrated in phantom), the processing system may send a request to an HIMC server to verify the integrated circuit chip. In one example, the request may be sent from the processing system to the HIMC server using a secure communications protocol, such as two-way TLS. For instance, the request may be encoded in a data packet that is encrypted using encryption keys that are generated specifically and uniquely for the connection between the processing system and the HIMC server. Furthermore, the data packet encoding the request may include a message authentication code that guards against loss or alteration of the request during transmission.

At step 308, the processing system may receive an instruction from the HIMC requesting a first signature for the integrated circuit chip. In one example, the instruction may be sent from the HIMC server to the processing system using a secure communications protocol, such as two-way TLS, as discussed above.

At step 310, the processing system may collect data about the current conditions of the integrated circuit chip from the plurality of sensors. The data may include, for example, the current temperature, supply voltage, electro-magnetic interference, frequency, and/or the like of the integrated circuit chip. Thus, the processing system may collect the data in step 310 by issuing a challenge to the integrated circuit chip, where the challenge may allow the processing system to determine a delay on a specific path of the integrated circuit chip under the current of conditions. In one example, a challenge as issued in step 310 creates two paths through the integrated circuit that are excited simultaneously. The digital response of the integrated circuit chip to the challenge may thus be based on a timing comparison of the delays of the two paths. Path delays in an integrated circuit are statistically distributed due to process variations during fabrication.

In one example, the processing system may wait to issue the challenge in step 310 until the processing system can determine that the challenge can be issued without interfering with operation of the motherboard. For instance, a secure hardware controller as disclosed herein may include intelligence that allows the secure hardware controller to monitor motherboard activity (power on/power off, etc.) and traffic density.

At step 312, the processing system may generate the first signature from the data collected in step 310. For example, the first signature may comprise a PUF.

At step 314, the processing system may send the first signature to the HIMC server using a secure communications protocol, such as two-way TLS, as discussed above.

At optional step 316 (illustrated in phantom), the processing system may receive an alert from the HIMC indicating the status of the integrated circuit chip. For instance, the alert may indicate that the integrated circuit chip is believed to be free from tampering or that the integrated circuit chip may have been tampered with. In one example, however, no alert is sent by the HIMC server as long as the integrated circuit chip is believed to be free from tampering (e.g., an alert is only received in step 316 if tampering is suspected).

At step 318, the method 300 may end.

It should be noted that the methods 200 and 300 may be expanded to include additional steps or may be modified to include additional operations with respect to the steps outlined above. In addition, although not specifically specified, one or more steps, functions, or operations of the methods 200 and 300 may include a storing, displaying, and/or outputting step as required for a particular application. In other words, any data, records, fields, and/or intermediate results discussed in the method can be stored, displayed, and/or outputted either on the device executing the method or to another device, as required for a particular application. Furthermore, steps, blocks, functions or operations in FIG. 2 or FIG. 3 that recite a determining operation or involve a decision do not necessarily require that both branches of the determining operation be practiced. In other words, one of the branches of the determining operation can be deemed as an optional step. Furthermore, steps, blocks, functions or operations of the above described method can be combined, separated, and/or performed in a different order from that described above, without departing from the examples of the present disclosure.

FIG. 4 depicts a high-level block diagram of a computing device or processing system specifically programmed to perform the functions described herein. As depicted in FIG. 4, the processing system 400 comprises one or more hardware processor elements 402 (e.g., a central processing unit (CPU), a microprocessor, or a multi-core processor), a memory 404 (e.g., random access memory (RAM) and/or read only memory (ROM)), a module 405 for protecting computing devices against malicious tampering, and various input/output devices 406 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computing device may employ a plurality of processor elements. Furthermore, although only one computing device is shown in the figure, if the method 200 or 300 as discussed above is implemented in a distributed or parallel manner for a particular illustrative example, i.e., the steps of the above method 200 or 300, or the entire method 200 or 300 is implemented across multiple or parallel computing devices, e.g., a processing system, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 402 can also be configured or programmed to cause other devices to perform one or more operations as discussed above. In other words, the hardware processor 402 may serve the function of a central controller directing other devices to perform the one or more operations as discussed above.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed method 200 or 300. In one example, instructions and data for the present module or process 405 for protecting computing devices against malicious tampering (e.g., a software program comprising computer-executable instructions) can be loaded into memory 404 and executed by hardware processor element 402 to implement the steps, functions, or operations as discussed above in connection with the illustrative method 200 or 300. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 405 for protecting computing devices against malicious tampering (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette, and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of illustration only, and not a limitation. Thus, the breadth and scope of any aspect of the present disclosure should not be limited by any of the above-described examples, but should be defined only in accordance with the following claims and their equivalents.

What is claimed is:

1. A method comprising:
sending, by a processing system of a server, an instruction to a controller installed on an integrated circuit chip of a remote computing device, wherein the instruction requests that the controller issue a challenge to the integrated circuit chip;
receiving, by the processing system, a first signature of the integrated circuit chip from the controller, wherein the first signature is derived by the controller from a response of the integrated circuit chip to the challenge;
comparing, by the processing system, the first signature to a second signature that is stored on the server, wherein the second signature was derived through testing of the integrated circuit chip prior to the integrated circuit chip being deployed in the remote computing device, wherein the testing comprises operating the integrated circuit chip under a plurality of combinations of conditions, and wherein the second signature comprises a first combination of the plurality of combinations of conditions that resulted in an alteration of a path delay of the integrated circuit chip; and
generating, by the processing system, an alert when the first signature fails to match the second signature, wherein the alert indicates that the integrated circuit chip may have been tampered with.

2. The method of claim 1, wherein the instruction is sent in response to the remote computing device being powered on.

3. The method of claim 1, wherein the instruction is sent periodically.

4. The method of claim 1, wherein each of the first signature and the second comprises a physical unclonable function.

5. The method of claim 1, wherein the first signature is sent using a secure communications protocol.

6. The method of claim 1, further comprising:
sending, by the processing system, the alert to a human administrator.

7. The method of claim 1, wherein the controller is in communication with a plurality of sensors on the integrated circuit chip, and the plurality of sensors comprises different types of sensors configured to monitor different physical conditions of the integrated circuit chip during the challenge.

8. The method of claim 7, wherein at least one sensor of the plurality of sensors measures a temperature of the integrated circuit chip.

9. The method of claim 7, wherein at least one sensor of the plurality of sensors measures a supply voltage of the integrated circuit chip.

10. The method of claim 7, wherein at least one sensor of the plurality of sensors measures an electro-magnetic interference of the integrated circuit chip.

11. A non-transitory computer-readable medium storing instructions which, when executed by a processing system of a server, cause the processing system to perform operations, the operations comprising:
sending an instruction to a controller installed on an integrated circuit chip of a remote computing device, wherein the instruction requests that the controller issue a challenge to the integrated circuit chip;
receiving a first signature of the integrated circuit chip from the controller, wherein the first signature is derived by the controller from a response of the integrated circuit chip to the challenge;
comparing the first signature to a second signature that is stored on the server, wherein the second signature was derived through testing of the integrated circuit chip prior to the integrated circuit chip being deployed in the remote computing device, wherein the testing comprises operating the integrated circuit chip under a plurality of combinations of conditions, and wherein the second signature comprises a first combination of the plurality of combinations of conditions that resulted in an alteration of a path delay of the integrated circuit chip; and
generating an alert when the first signature fails to match the second signature, wherein the alert indicates that the integrated circuit chip may have been tampered with.

12. The non-transitory computer-readable medium of claim 11, wherein each of the first signature and the second comprises a physical unclonable function.

13. The non-transitory computer-readable medium of claim 11, wherein the controller is in communication with a plurality of sensors on the integrated circuit chip, and the plurality of sensors comprises different types of sensors configured to monitor different physical conditions of the integrated circuit chip during the challenge.

14. The non-transitory computer-readable medium of claim 11, wherein the first signature is sent using a secure communications protocol.

15. A system deployed on an integrated circuit chip of a computing device, comprising:
a plurality of sensors to monitor a plurality of physical conditions of the integrated circuit chip; and
a controller communicatively coupled to the plurality of sensors to issue a challenge to the integrated circuit chip and to derive a first signature for the integrated circuit chip from a response of the integrated circuit chip to the challenge, wherein the controller is further communicatively coupled to a remote server that stores a second signature for the integrated circuit chip, wherein the second signature was derived through testing of the integrated circuit chip prior to the integrated circuit chip being deployed in the computing device, wherein the testing comprises operating the integrated circuit chip under a plurality of combinations of conditions, and wherein the second signature comprises a first combination of the plurality of combinations of conditions that resulted in an alteration of a path delay of the integrated circuit chip.

16. The system of claim 15, wherein each of the first signature and the second signature comprises a physical unclonable function.

17. The system of claim 15, wherein the controller is housed in a tamper-resistant enclosure.

18. The system of claim 15, wherein at least one sensor of the plurality of sensors measures a temperature of the integrated circuit chip.

19. The system of claim 15, wherein at least one sensor of the plurality of sensors measures a supply voltage of the integrated circuit chip.

20. The system of claim 15, wherein at least one sensor of the plurality of sensors measures an electro-magnetic interference of the integrated circuit chip.

\* \* \* \* \*